United States Patent
Noda et al.

(10) Patent No.: US 11,149,884 B2
(45) Date of Patent: Oct. 19, 2021

(54) ECCENTRIC UNIVERSAL JOINT MECHANISM AND ECCENTRIC UNIVERSAL JOINT

(71) Applicant: THE VICTAULIC COMPANY OF JAPAN LIMITED, Tokyo-to (JP)

(72) Inventors: Yuji Noda, Kusatsu (JP); Yoshikuni Itou, Ritto (JP); Isamu Funakoshi, Kusatsu (JP); Masahiro Ueda, Kusatsu (JP)

(73) Assignee: THE VICTAULIC COMPANY OF JAPAN LIMITED, Tokyo (JP)

( * ) Notice: Subject to any disclaimer, the term of this patent is extended or adjusted under 35 U.S.C. 154(b) by 280 days.

(21) Appl. No.: 16/462,561

(22) PCT Filed: Nov. 27, 2017

(86) PCT No.: PCT/JP2017/042377
§ 371 (c)(1),
(2) Date: May 21, 2019

(87) PCT Pub. No.: WO2018/101199
PCT Pub. Date: Jun. 7, 2018

(65) Prior Publication Data
US 2020/0063901 A1 Feb. 27, 2020

(30) Foreign Application Priority Data

Nov. 30, 2016 (JP) .............................. JP2016-233481
Feb. 23, 2017 (JP) .............................. JP2017-032629

(51) Int. Cl.
*F16L 27/02* (2006.01)

(52) U.S. Cl.
CPC ................................. *F16L 27/026* (2013.01)

(58) Field of Classification Search
CPC .. F16L 25/12; F16L 25/14; F16L 27/02; F16L 27/026; F16L 27/1021; F16L 27/113; F16L 27/1133; F16L 27/125
(Continued)

(56) References Cited

U.S. PATENT DOCUMENTS 1,304,980 A * 5/1919 Hirshstein ........... F16L 27/0849
285/184
1,704,003 A 3/1929 Johnson
(Continued)

FOREIGN PATENT DOCUMENTS

JP S58-60087 U 4/1983
JP H02-40385 Y2 10/1990
(Continued)

OTHER PUBLICATIONS

Feb. 13, 2018 International Search Report issued in International Patent Application No. PCT/JP2017/042377.
(Continued)

*Primary Examiner* — Aaron M Dunwoody
(74) *Attorney, Agent, or Firm* — Oliff PLC

(57) ABSTRACT

An eccentric universal joint mechanism, even when there is a lateral displacement between a first pipe and a second pipe, can absorb the displacement and connect the first pipe and the second pipe. The eccentric universal joint mechanism includes: a first sleeve; a second sleeve; and an eccentric universal joint connecting the first sleeve and the second sleeve. The eccentric universal joint includes a first eccentric pipe, and a second eccentric pipe rotatably joined to the first eccentric pipe. A displacement between the center line of the first eccentric pipe and the center line of the second eccentric pipe is determined by the rotational position of the second eccentric pipe.

10 Claims, 13 Drawing Sheets

(58) Field of Classification Search
USPC ...... 285/112, 145.4, 148.27, 148.22, 223, 31
See application file for complete search history.

(56) References Cited

U.S. PATENT DOCUMENTS

| | | |
|---|---|---|
| 4,776,617 A | 10/1988 | Sato |
| 2005/0253029 A1 | 11/2005 | Gibb et al. |
| 2013/0257045 A1 | 10/2013 | Mikami |
| 2014/0097613 A1 | 4/2014 | Ikeda |

FOREIGN PATENT DOCUMENTS

| | | | |
|---|---|---|---|
| JP | H03-285137 A | 12/1991 |
| JP | H05-164279 A | 6/1993 |
| JP | 2004-10355 A | 1/2004 |
| JP | 2004-11093 A | 1/2004 |
| JP | 2004-53317 A | 2/2004 |
| JP | 2004-162843 A | 6/2004 |
| JP | 2005-91215 A | 4/2005 |
| JP | 2012-137191 A | 7/2012 |
| JP | 2013-210043 A | 10/2013 |
| JP | 2014-61077 A | 4/2014 |
| JP | WO2013/005802 A1 | 2/2015 |

OTHER PUBLICATIONS

Nov. 6, 2020 Office Action issued in Japanese Patent Application No. 2017-032629.
Nov. 26, 2020 Office Action issued in Indonesian Patent Application No. PID201904429.
Dec. 2, 2020 Office Action issued in Korean Patent Application No. 10-2019-7018067.
Jul. 29, 2020 Office Action issued in Chinese Patent Application No. 201780070609.8.

* cited by examiner

ECCENTRIC UNIVERSAL JOINT MECHANISM AND ECCENTRIC UNIVERSAL JOINT

TECHNICAL FIELD

The present invention relates to an eccentric universal joint mechanism and an eccentric universal joint for connecting a first pipe and a second pipe, and more particularly to an eccentric universal joint mechanism and an eccentric universal joint which can securely connect a first pipe and a second pipe even when there is a displacement between the first pipe and the second pipe.

BACKGROUND ART

Expansion joints for connecting a first pipe and a second pipe are known in the art.

Even when there is some axial displacement between a first pipe and a second pipe, an expansion joint can absorb the displacement and connect the first pipe and the second pipe in an appropriate fashion.

In contrast, when there is a lateral displacement between a first pipe and a second pipe, it is difficult to absorb the lateral displacement and connect the first pipe and the second pipe.

CITATION LIST

Patent Literature

Patent document 1: Japanese Patent Laid-Open Publication No. H3-285137
Patent document 2: Japanese Patent Laid-Open Publication No. 2005-91215
Patent document 3: Japanese Patent Laid-Open Publication No. 2004-53317
Patent document 4: Japanese Patent Laid-Open Publication No. 2004-10355

SUMMARY OF THE INVENTION

Problems to be Solved by the Invention

The present invention has been made in view of the above situation. It is therefore an object of the present invention to provide an eccentric universal joint mechanism and an eccentric universal joint which, even when there is some axial and lateral displacement between a first pipe and a second pipe, can absorb the displacement and securely connect the first pipe and the second pipe.

Means for Solving the Problems

The present invention provides an eccentric universal joint mechanism comprising: a first sleeve; a second sleeve; and an eccentric universal joint connecting the first sleeve and the second sleeve, wherein the eccentric universal joint includes a first eccentric pipe joined to the first sleeve and having a first opening and a second opening whose axes are eccentric to each other, and a second eccentric pipe joined to the second sleeve and rotatably joined to the first eccentric pipe, and having a third opening and a fourth opening whose axes are eccentric to each other, wherein the first opening of the first eccentric pipe is joined to the third opening of the second eccentric pipe, and wherein a displacement between the axis of the second opening of the first eccentric pipe and the axis of the fourth opening of the second eccentric pipe is determined by the rotational position of the second eccentric pipe with respect to the first eccentric pipe.

In a preferred embodiment of the present invention, a joining area between the first eccentric pipe and the second eccentric pipe in the eccentric universal joint is covered with a first packing which is held by a dividable first housing.

In a preferred embodiment of the present invention, a joining area between the first sleeve and the first eccentric pipe or a joining area between the second sleeve and the second eccentric pipe are each covered with a second packing which is held by a dividable second housing.

In a preferred embodiment of the present invention, at least the first sleeve and the first eccentric pipe are slidable with respect to each other in the axial direction, and a joining area between the first sleeve and the first eccentric pipe is covered with a sliding packing which is held by a dividable sliding packing housing.

In a preferred embodiment of the present invention, at least the first sleeve and the first eccentric pipe are fixed by tie bolts in the axial direction.

The present invention also provides an eccentric universal joint mechanism comprising: a first sleeve; and an eccentric universal joint joined to the first sleeve, wherein the eccentric universal joint includes a first eccentric pipe joined to the first sleeve and having a first opening and a second opening whose axes are eccentric to each other, and a second eccentric pipe rotatably joined to the first eccentric pipe and having a third opening and a fourth opening whose axes are eccentric to each other, the second eccentric pipe being to be connected to a mounting flange of an existing pipe via a mounting housing, wherein the first opening of the first eccentric pipe is joined to the third opening of the second eccentric pipe, and wherein a displacement between the axis of the second opening of the first eccentric pipe and the axis of the fourth opening of the second eccentric pipe is determined by the rotational position of the second eccentric pipe with respect to the first eccentric pipe.

In a preferred embodiment of the present invention, the first opening and the second opening of the first eccentric pipe have the same diameter, and the third opening and the fourth opening of the second eccentric pipe have the same diameter.

In a preferred embodiment of the present invention, the first opening and the second opening of the first eccentric pipe have different diameters, and the third opening and the fourth opening of the second eccentric pipe have different diameters.

The present invention also provides an eccentric universal joint comprising: a first eccentric pipe having a first opening and a second opening whose axes are eccentric to each other; and a second eccentric pipe rotatably joined to the first eccentric pipe and having a third opening and a fourth opening whose axes are eccentric to each other, wherein the first opening of the first eccentric pipe is joined to the third opening of the second eccentric pipe, and wherein a displacement between the axis of the second opening of the first eccentric pipe and the axis of the fourth opening of the second eccentric pipe is determined by the rotational position of the second eccentric pipe with respect to the first eccentric pipe.

In a preferred embodiment of the present invention, a joining area between the first eccentric pipe and the second eccentric pipe is covered with a first packing which is held by a dividable first housing.

In a preferred embodiment of the present invention, the first opening and the second opening of the first eccentric pipe have the same diameter, and the third opening and the fourth opening of the second eccentric pipe have the same diameter.

In a preferred embodiment of the present invention, the first opening and the second opening of the first eccentric pipe have different diameters, and the third opening and the fourth opening of the second eccentric pipe have different diameters.

Advantageous Effects of the Invention

Even when there is some axial and lateral displacement between a first pipe and a second pipe, the eccentric universal joint mechanism and the eccentric universal joint according to the present invention can absorb the displacement and securely connect the first pipe and the second pipe.

DESCRIPTION OF THE EMBODIMENTS

First Embodiment

An eccentric universal joint mechanism and an eccentric universal joint according to a first embodiment will now be described with reference to FIGS. 1 through 3B.

Figure 1:
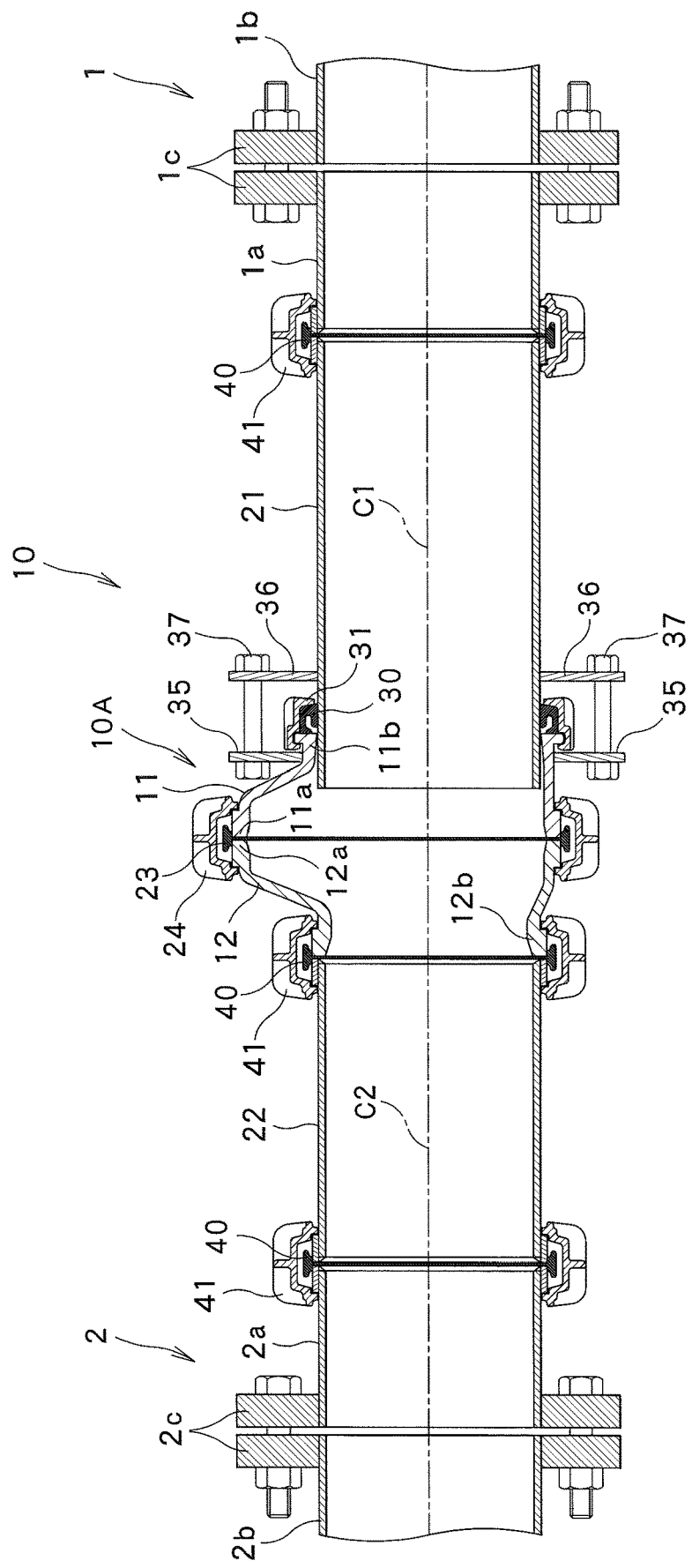
FIG. 1 is a cross-sectional side view of an eccentric universal joint mechanism and an eccentric universal joint according to a first embodiment.
Figure 2:
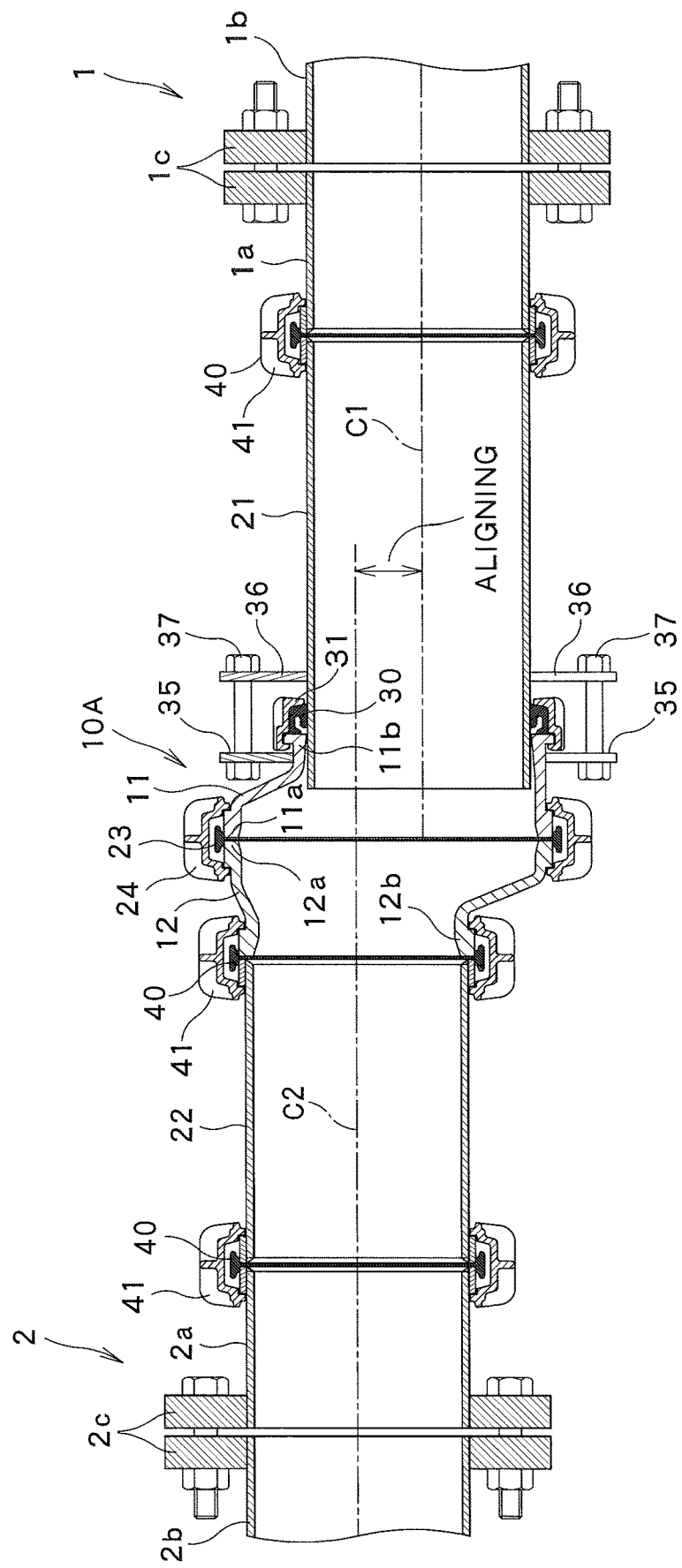
FIG. 2 is a cross-sectional side view illustrating the action of the eccentric universal joint mechanism and the eccentric universal joint according to the first embodiment.
Figure 3A:
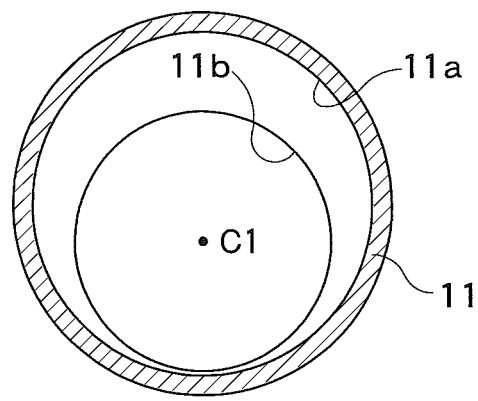
FIG. 3A is a front view of a first eccentric pipe.
Figure 3B:
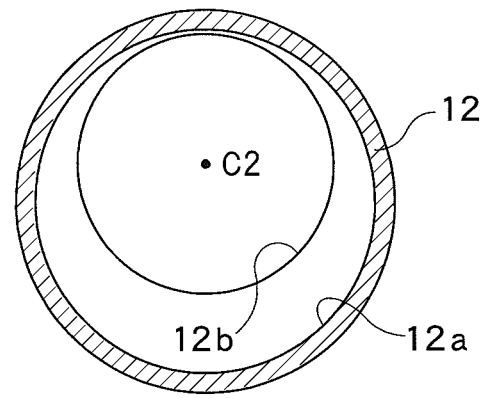
FIG. 3B is a front view of a second eccentric pipe.

FIG. 1 is a cross-sectional side view of the eccentric universal joint mechanism and the eccentric universal joint, FIG. 2 is a cross-sectional side view showing the state of the eccentric universal joint mechanism when a part of the eccentric universal joint has made a rotational movement, FIG. 3A is a front view showing the interior of a first eccentric pipe, and FIG. 3B is a front view showing the interior of a second eccentric pipe.

As shown in FIG. 1 through FIGS. 3A and 3B, the eccentric universal joint mechanism 10 is to connect a first pipe 1 and a second pipe 2.

The first pipe 1 and the second pipe 2, which are existing ones, can sometimes be installed at a position somewhat displaced from a design position in the axial direction and in the lateral direction.

Even when the first pipe 1 and the second pipe 2 are somewhat displaced axially and laterally from a design position, the eccentric universal joint mechanism 10 according to the present invention can connect the first pipe 1 and the second pipe 2 in an appropriate fashion.

The eccentric universal joint mechanism 10 includes a first sleeve 21, a second sleeve 22, and an eccentric universal joint 10A connecting the first sleeve 21 and the second sleeve 22.

The eccentric universal joint 10A includes a first eccentric pipe 11 joined to the first sleeve 21, and a second eccentric pipe 12 joined to the second sleeve 22 and rotatably joined to the first eccentric pipe 11.

The first eccentric pipe 11 and the second eccentric pipe 12 have approximately the same structure. In particular, as shown in FIG. 3A, the first eccentric pipe 11 has a large-diameter portion 11a (first opening) of the side of the second eccentric pipe 12 and a small-diameter portion (second opening) 11b of the side of the first sleeve 21. The axis of the small-diameter portion 11b is eccentric to the axis of the large-diameter portion 11a. The axis of the small-diameter portion 11b constitutes the center line C1 of the first eccentric pipe 11.

As shown in FIG. 3B, the second eccentric pipe 12 has a large-diameter portion (third opening) 12a of the side of the first eccentric pipe 11, and a small-diameter portion (fourth opening) 12b of the side of the second sleeve 22. The axis of the small-diameter portion 12b is eccentric to the axis of the large-diameter portion 12a. The axis of the small-diameter portion 12b constitutes the center line C2 of the second eccentric pipe 12. The large-diameter portion (first opening) 11a of the first eccentric pipe 11 is joined to the large-diameter portion (third opening) 12a of the second eccentric pipe 12.

Referring to FIGS. 3A and 3B, by rotating the second eccentric pipe 12 with respect to the first eccentric pipe 11, the axis of the small-diameter portion 12b of the second eccentric pipe 12 (i.e. the center line C2 of the second eccentric pipe 12) can be made to coincide with the axis of the small-diameter portion 11b of the first eccentric pipe 11 (i.e. the center line C1 of the first eccentric pipe 11) (see FIG. 1).

By further rotating the second eccentric pipe 12 with respect to the first eccentric pipe 11, the axis of the small-diameter portion 12b of the second eccentric pipe 12 (i.e. the center line C2 of the second eccentric pipe 12) can be significantly displaced from the axis of the small-diameter portion 11b of the first eccentric pipe 11 (i.e. the center line C1 of the first eccentric pipe 11). Therefore, even when there is a considerable displacement between the first sleeve 21 and the second sleeve 22 in the lateral direction, the eccentric universal joint 10A can make an adjustment (aligning) to the lateral displacement.

A joining area between the first eccentric pipe 11 and the second eccentric pipe 12 in the eccentric universal joint 10A is covered with a first packing 23. The first packing 23 is held by a first housing 24 which surrounds the first packing 23 and which is circumferentially divided. Each division of the first housing 24 is fixed by fixing bolts (not shown).

As shown in FIGS. 1 and 2, the first eccentric pipe 11 of the eccentric universal joint 10A and the first sleeve 21 are joined slidably with respect to each other in the axial direction. A joining area between the first eccentric pipe 11 and the first sleeve 21 is covered with a sliding packing 30. The sliding packing 30 is held by a sliding packing housing 31 which is circumferentially divided. The first sleeve 21 is joined to the first pipe 1. The second eccentric pipe 12 of the eccentric universal joint 10A is joined to the second sleeve 22 which, in turn, is joined to the second pipe 2.

A joining area between the second eccentric pipe 12 of the eccentric universal joint 10A and the second sleeve 22, a joining area between the first sleeve 21 and the first pipe 1, and a joining area between the second sleeve 22 and the second pipe 2 are each covered with a second packing 40. The second packings 40 are each held by a second housing 41 which surrounds the second packing 40 and which is circumferentially divided.

As shown in FIG. 1, the first pipe 1 and the second pipe 2, on the first sleeve 21 side and on the second sleeve 22 side, have a short flange pipe 1a and a short flange pipe 2a, respectively. The short flange pipes 1a, 2a are connected to main pipes 1b, 2b via flanges 1c, 2c. The short flange pipe 1a and the main pipe 1b constitute the first pipe 1, while the short flange pipe 2a and the main pipe 2b constitute the second pipe 2. The first eccentric pipe 11 of the eccentric universal joint 10A has, on its exterior surface, a mounting flange 35, while the first sleeve 21 has, on its exterior surface, a mounting flange 36. The first eccentric pipe 11 and the first sleeve 21 are fixed in the circumferential direction and in the axial direction by tie bolts 37 mounted to the mounting flanges 35, 36 along the circumferential direction.

The operation of the thus-constructed eccentric universal joint mechanism 10 of this embodiment will now be described with reference to FIG. 1 through FIGS. 3A and 3B.

When the existing first and second pipes 1, 2 are displaced from a design position in the lateral direction, the second eccentric pipe 12 of the eccentric universal joint 10A is rotated with respect to the first eccentric pipe 11 to displace the center line C2 of the second eccentric pipe 12 from the center line C1 of the first eccentric pipe 11 by a distance which is equal to the lateral displacement between the first pipe 1 and the second pipe 2, as shown in FIG. 2. The operation of displacing the center line C2 of the second eccentric pipe 12 from the center line C1 of the first eccentric pipe 11 by a distance equal to the lateral displacement between the first pipe 1 and the second pipe 2 is termed aligning. The second pipe 2 is laterally (vertically in FIG. 2) displaced with respect to the first pipe 1; accordingly, the aligning of the eccentric universal joint 10A is performed by laterally (vertically) displacing the center line C2 of the second eccentric pipe 12 with respect to the center line C1 of the first eccentric pipe 11.

Thereafter, the displacement between the center line C1 of the first eccentric pipe 11 and the center line C2 of the second eccentric pipe 12 is maintained without rotation of the second eccentric pipe 12 with respect to the first eccentric pipe 11.

When the first pipe 1 and the second pipe 2 are slightly displaced from the design position in the axial direction, the first eccentric pipe 11 of the eccentric universal joint 10A is slid with respect to the first sleeve 21 in the axial direction.

Next, the first eccentric pipe 11 and the first sleeve 21 are fixed by the tie bolts 37 in both the axial direction and the circumferential direction.

As described above, the second eccentric pipe 12 is rotated with respect to the first eccentric pipe 11 to displace the center line C2 of the second eccentric pipe 12 from the center line C1 of the first eccentric pipe 11, and the first eccentric pipe 11 is slid with respect to the first sleeve 21 in the axial direction. By performing such an operation, even when the first pipe 1 and the second pipe 2 are laterally and axially displaced with respect to a design position, the eccentric universal joint mechanism 10 can absorb the displacement and securely connect the first pipe 1 and the second pipe 2.

Second Embodiment

A second embodiment of the present invention will now be described with reference to FIGS. 4A through 7B.

The second embodiment shown in FIGS. 4A through 7B differs from the above-described first embodiment in that the first eccentric pipe 11 of the eccentric universal joint 10A is axially slidable with respect to the first sleeve 21 and the second eccentric pipe 12 is axially slidable with respect to the second sleeve 22; however, the other construction of the second embodiment is substantially the same as the first embodiment shown in FIGS. 1 through 3B.

In the second embodiment shown in FIGS. 4A through 7B, the same symbols are used for the same components or elements as those of the first embodiment shown in FIGS. 1 through 3B, and a detailed description thereof is omitted.

Referring to FIGS. 4A through 7B, the first eccentric pipe 11 and the second eccentric pipe 12 of the eccentric universal joint 10A slide with respect to the first sleeve 21 and the second sleeve 22, respectively, in the axial direction. A joining area between the first eccentric pipe 11 and the first sleeve 21 is covered with a sliding packing 30. The sliding packing 30 is held by a sliding packing housing 31 which is circumferentially divided.

The first eccentric pipe 11 of the eccentric universal joint 10A has, on its exterior surface, a mounting flange 35, while the first sleeve 21 has, on its exterior surface, a mounting flange 36. The first eccentric pipe 11 and the first sleeve 21 can be fixed in the circumferential direction and in the axial direction by tie bolts mounted to the mounting flanges 35, 36 along the circumferential direction.

The second eccentric pipe 12 has, on its exterior surface, a mounting flange 45, while the second sleeve 22 has, on its exterior surface, a mounting flange 46. The second eccentric pipe 12 and the second sleeve 22 can be fixed in the circumferential direction and in the axial direction by tie bolts 47 mounted to the mounting flanges 45, 46 along the circumferential direction.

Figure 4A:
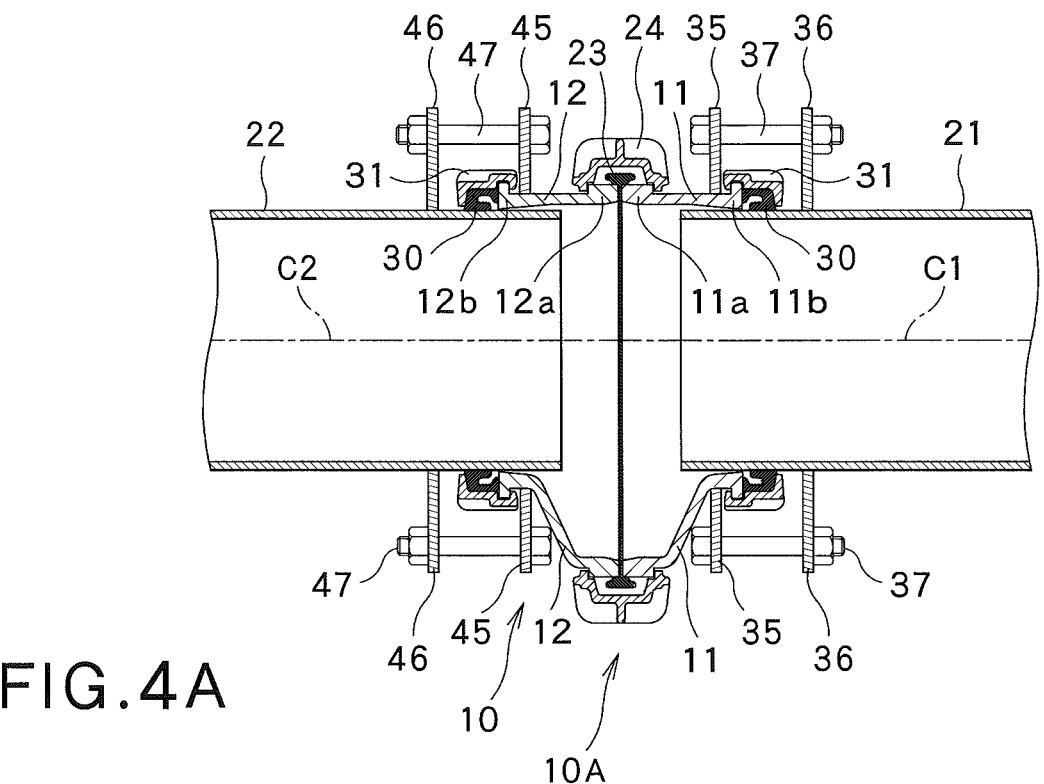
FIG. 4A is a cross-sectional side view illustrating the action of an eccentric universal joint mechanism and an eccentric universal joint according to a second embodiment.

Referring to FIG. 4A, the center line C1 of the first eccentric pipe 11 of the eccentric universal joint mechanism 10 coincides with the center line C2 of the second eccentric pipe 12, and the first eccentric pipe 11 and the second eccentric pipe 12 do not slide with respect to the first sleeve 21 and the second sleeve 22 in the axial direction. In this case, the eccentric universal joint mechanism 10 of this embodiment can connect the first pipe 1 and the second pipe 2 which are not displaced from a design position in the lateral direction and the axial direction.

Figure 4B:
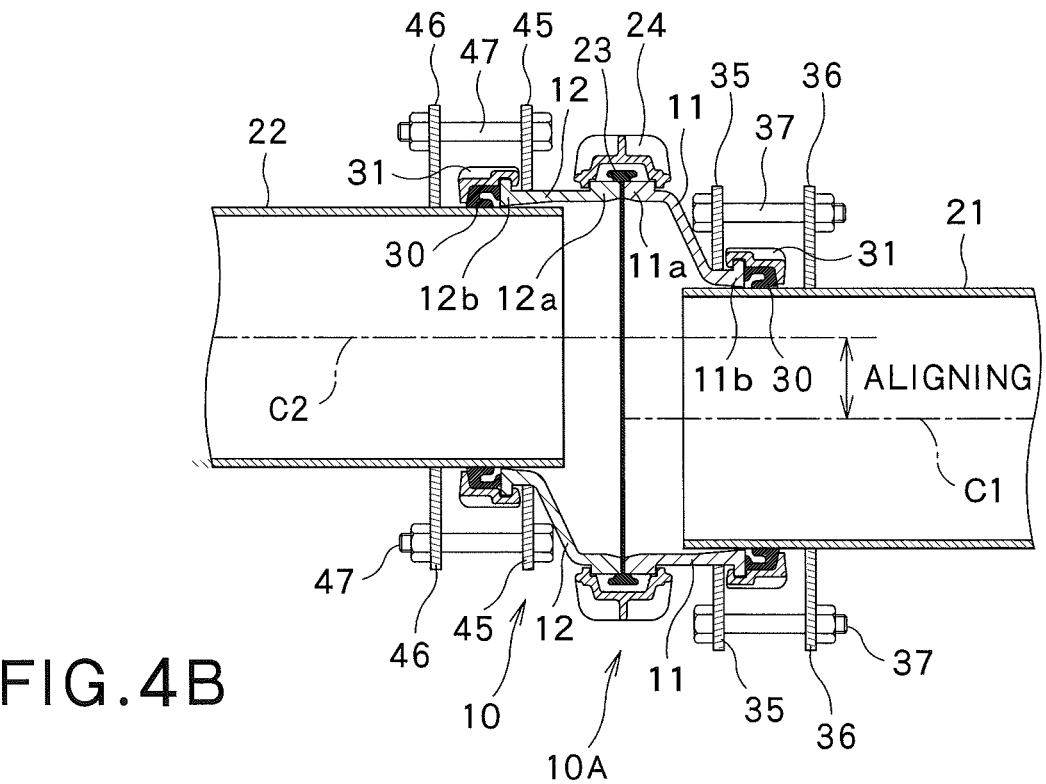
FIG. 4B is a cross-sectional side view illustrating the action of the eccentric universal joint mechanism and the eccentric universal joint according to the second embodiment.

As shown in FIG. 4B, when the first pipe 1 and the second pipe 2 are displaced from a design position in the lateral direction (in the vertical direction in FIG. 4B), the second eccentric pipe 12 of the eccentric universal joint 10A is rotated with respect to the first eccentric pipe 11 to displace the center line C2 of the second eccentric pipe 12 from the center line C1 of the first eccentric pipe 11.

Next, the first eccentric pipe 11 and the first sleeve 21 are fixed by the tie bolts 37 in both the axial direction and the circumferential direction. Further, the second eccentric pipe 12 and the second sleeve 22 are fixed by the tie bolts 47 in both the axial direction and the circumferential direction.

By thus displacing the center line C2 of the second eccentric pipe 12 from the center line C1 of the first eccentric pipe 11, even when the first pipe 1 and the second pipe 2 are laterally displaced with respect to a design position, the eccentric universal joint mechanism 10 can absorb the displacement and securely connect the first pipe 1 and the second pipe 2.

Figure 5A:
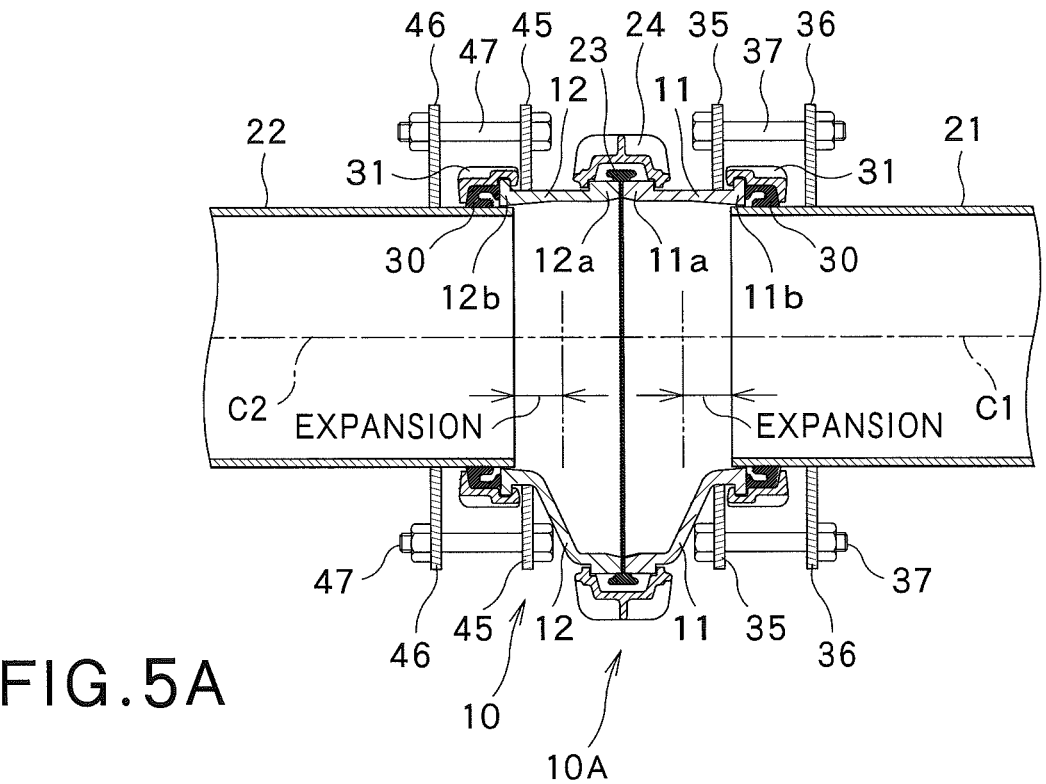
FIG. 5A is a cross-sectional side view illustrating the action of the eccentric universal joint mechanism and the eccentric universal joint according to the second embodiment.

As shown in FIG. 5A, when the first pipe 1 and the second pipe 2 are displaced from a design position in the axial direction (in the horizontal direction in FIG. 5A), the first eccentric pipe 11 of the eccentric universal joint 10A is slid with respect to the first sleeve 21 in the axial direction, and the second eccentric pipe 12 is slid with respect to the second sleeve 22 in the axial direction so as to expand the eccentric universal joint mechanism 10 in the axial direction.

Next, the first eccentric pipe 11 and the first sleeve 21 are fixed by the tie bolts 37 in both the axial direction and the circumferential direction. Further, the second eccentric pipe 12 and the second sleeve 22 are fixed by the tie bolts 47 in both the axial direction and the circumferential direction.

By thus sliding the first eccentric pipe 11 with respect to the first sleeve 21 in the axial direction, and sliding the second eccentric pipe 12 with respect to the second sleeve 22 in the axial direction, even when the first pipe 1 and the second pipe 2 are axially displaced with respect to a design position, the eccentric universal joint mechanism 10 can absorb the displacement and securely connect the first pipe 1 and the second pipe 2.

Figure 5B:
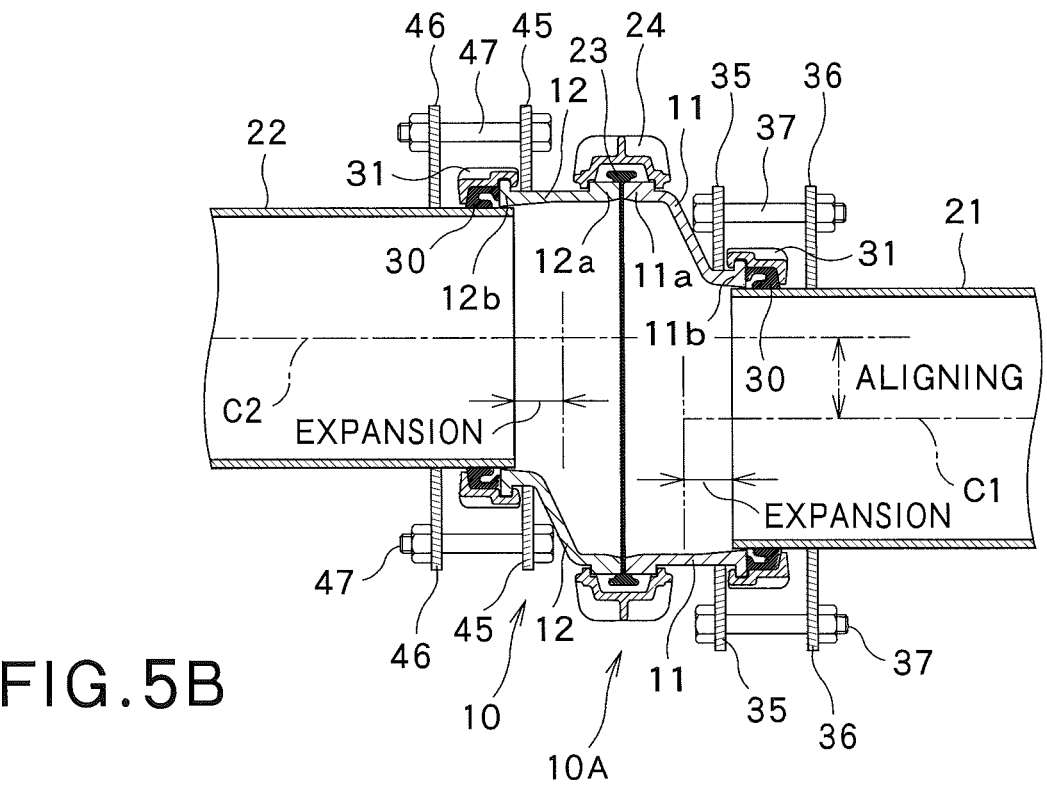
FIG. 5B is a cross-sectional side view illustrating the action of the eccentric universal joint mechanism and the eccentric universal joint according to the second embodiment.

As shown in FIG. 5B, when the first pipe 1 and the second pipe 2 are displaced from a design position in both the lateral direction (the vertical direction in FIG. 5B) and the axial direction (the horizontal direction in FIG. 5B), the second eccentric pipe 12 of the eccentric universal joint 10A is rotated with respect to the first eccentric pipe 11 to displace the center line C2 of the second eccentric pipe 12 from the center line C1 of the first eccentric pipe 11. At the same time, the first eccentric pipe 11 and the second eccentric pipe 12 are slid with respect to the first sleeve 21 and the second sleeve 22, respectively, in the axial direction to expand the eccentric universal joint mechanism 10 in the axial direction.

Next, the first eccentric pipe 11 and the first sleeve 21 are fixed by the tie bolts 37 in both the axial direction and the circumferential direction. Further, the second eccentric pipe 12 and the second sleeve 22 are fixed by the tie bolts 47 in both the axial direction and the circumferential direction.

By thus displacing the center line C2 of the second eccentric pipe 12 from the center line C1 of the first eccentric pipe 11, and expanding the eccentric universal joint mechanism 10 in the axial direction, even when the first pipe 1 and the second pipe 2 are displaced from a design position in both the lateral direction and the axial direction, the eccentric universal joint mechanism 10 can absorb the displacement and securely connect the first pipe 1 and the second pipe 2.

Figure 6A:
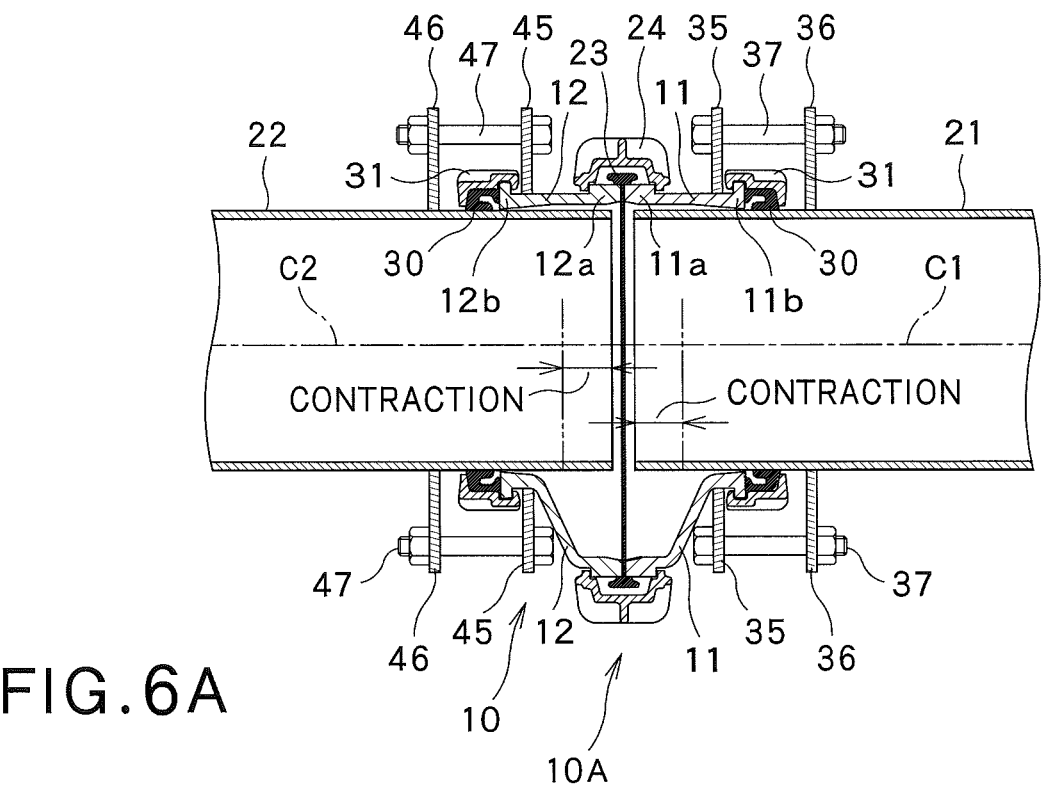
FIG. 6A is a cross-sectional side view illustrating the action of the eccentric universal joint mechanism and the eccentric universal joint according to the second embodiment.

As shown in FIG. 6A, when the first pipe 1 and the second pipe 2 are displaced from a design position in the axial direction (in the horizontal direction in FIG. 6A), the first eccentric pipe 11 of the eccentric universal joint 10A is slid with respect to the first sleeve 21 in the axial direction, and the second eccentric pipe 12 is slid with respect to the second sleeve 22 in the axial direction so as to contract the eccentric universal joint mechanism 10 in the axial direction.

Next, the first eccentric pipe 11 and the first sleeve 21 are fixed by the tie bolts 37 in both the axial direction and the circumferential direction. Further, the second eccentric pipe 12 and the second sleeve 22 are fixed by the tie bolts 47 in both the axial direction and the circumferential direction.

By thus sliding the first eccentric pipe 11 with respect to the first sleeve 21 in the axial direction, and sliding the second eccentric pipe 12 with respect to the second sleeve 22 in the axial direction, even when the first pipe 1 and the second pipe 2 are axially displaced with respect to a design position, the eccentric universal joint mechanism 10 can absorb the displacement and securely connect the first pipe 1 and the second pipe 2.

Figure 6B:
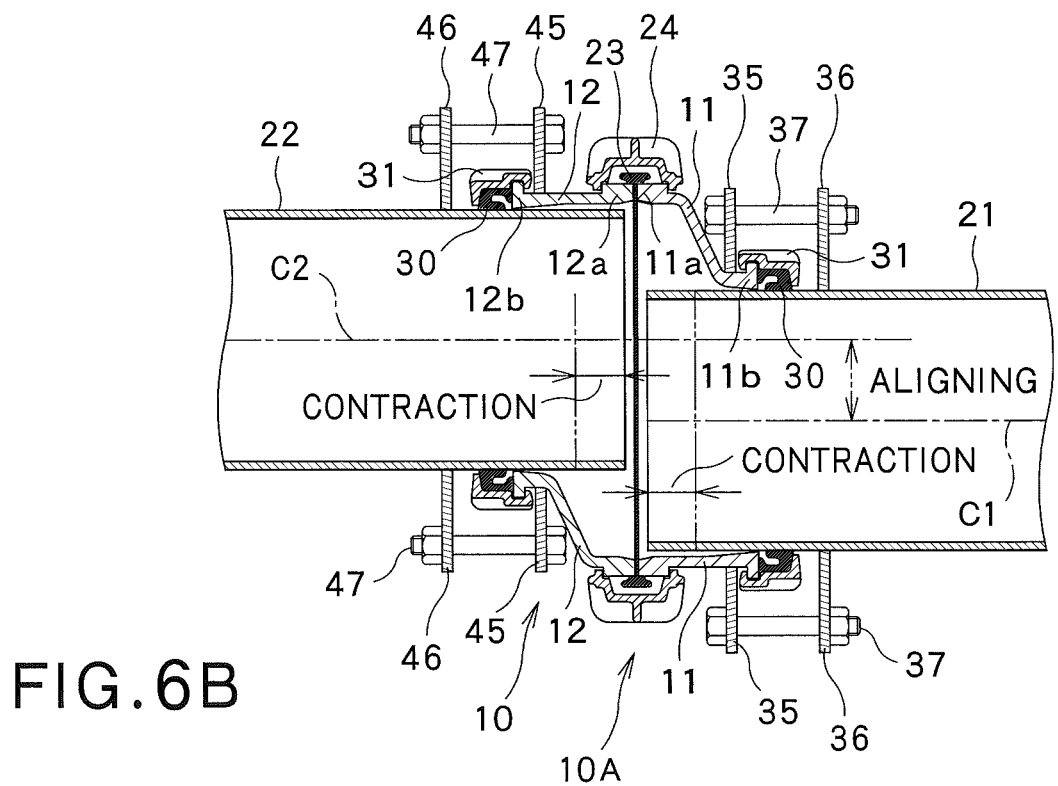
FIG. 6B is a cross-sectional side view illustrating the action of the eccentric universal joint mechanism and the eccentric universal joint according to the second embodiment.

As shown in FIG. 6B, when the first pipe 1 and the second pipe 2 are displaced from a design position in both the lateral direction (the vertical direction in FIG. 6B) and the axial direction (the horizontal direction in FIG. 6B), the second eccentric pipe 12 of the eccentric universal joint 10A is rotated with respect to the first eccentric pipe 11 to displace the center line C2 of the second eccentric pipe 12 from the center line C1 of the first eccentric pipe 11. At the same time, the first eccentric pipe 11 and the second eccentric pipe 12 are slid with respect to the first sleeve 21 and the second sleeve 22, respectively, in the axial direction to contract the eccentric universal joint mechanism 10 in the axial direction.

Next, the first eccentric pipe 11 and the first sleeve 21 are fixed by the tie bolts 37 in both the axial direction and the circumferential direction. Further, the second eccentric pipe 12 and the second sleeve 22 are fixed by the tie bolts 47 in both the axial direction and the circumferential direction.

By thus displacing the center line C2 of the second eccentric pipe 12 from the center line C1 of the first eccentric pipe 11, and contracting the eccentric universal joint mechanism 10 in the axial direction, even when the first pipe 1 and the second pipe 2 are displaced from a design position in both the lateral direction and the axial direction, the eccentric universal joint mechanism 10 can absorb the displacement and securely connect the first pipe 1 and the second pipe 2.

Figure 7A:
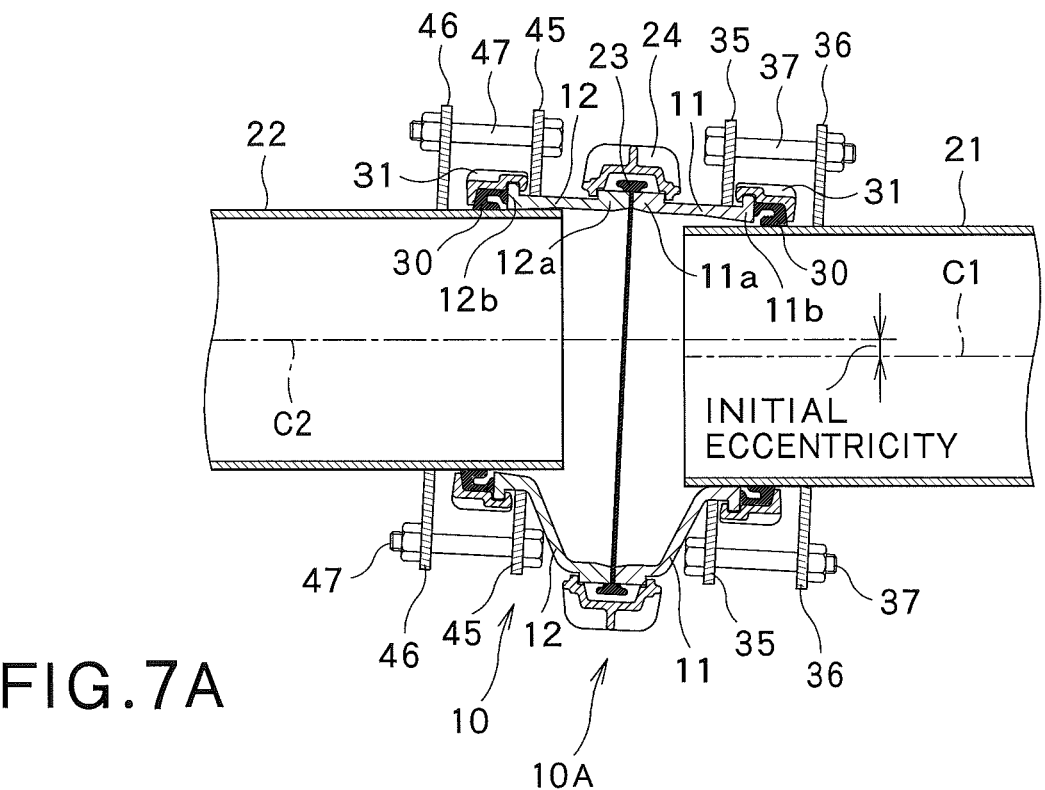
FIG. 7A is a cross-sectional side view illustrating the action of the eccentric universal joint mechanism and the eccentric universal joint according to the second embodiment.

As shown in FIG. 7A, when the first pipe 1 and the second pipe 2 are slightly displaced in the lateral direction (in the vertical direction in FIG. 7A), there occurs a slight initial eccentricity of the second eccentric pipe 12 of the eccentric universal joint 10A with respect to the first eccentric pipe 11.

The first eccentric pipe 11 and the first sleeve 21 have been fixed by the tie bolts 37 in both the axial direction and the circumferential direction. Further, the second eccentric pipe 12 and the second sleeve 22 have been fixed by the tie bolts 47 in both the axial direction and the circumferential direction.

The eccentric universal joint mechanism 10 can thus absorb the initial eccentricity that occurs between the first eccentric pipe 11 and the second eccentric pipe 12, and can securely connect the first pipe 1 and the second pipe 2.

Figure 7B:
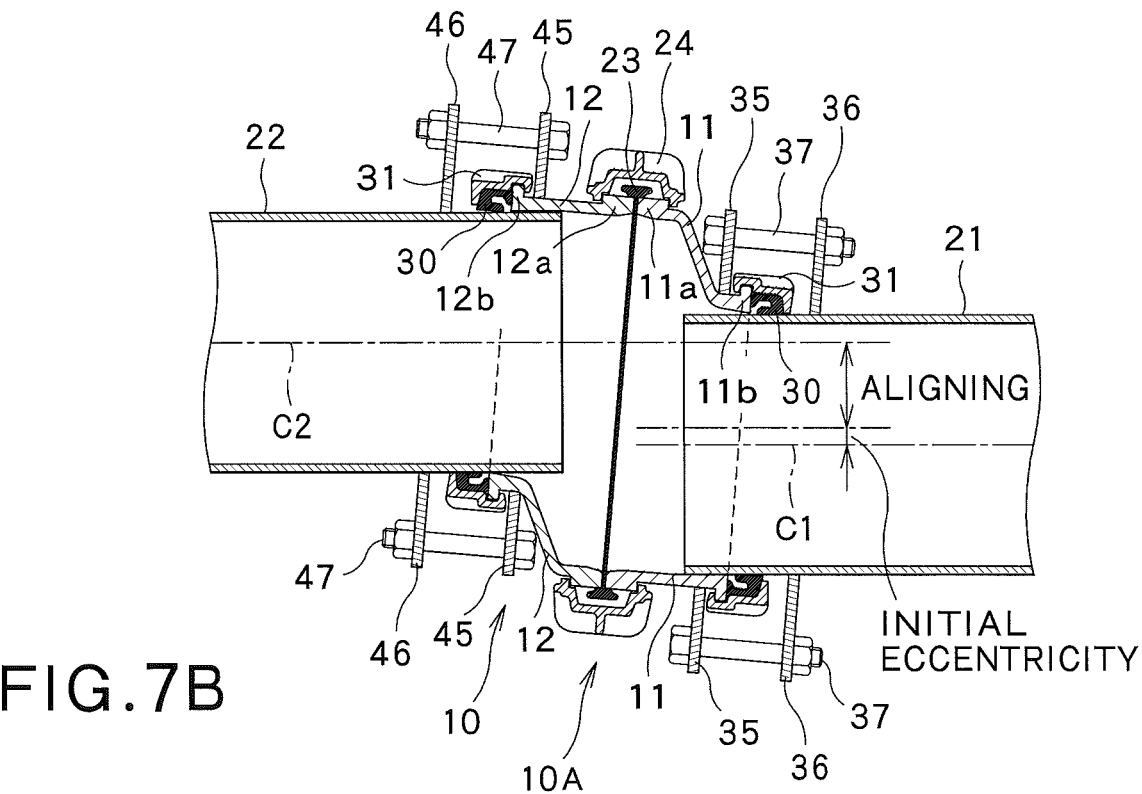
FIG. 7B is a cross-sectional side view illustrating the action of the eccentric universal joint mechanism and the eccentric universal joint according to the second embodiment.

As shown in FIG. 7B, when the first pipe 1 and the second pipe 2 are displaced from a design position in the lateral direction (in the vertical direction in FIG. 7B), the second eccentric pipe 12 of the eccentric universal joint 10A is rotated with respect to the first eccentric pipe 11 to displace the center line C2 of the second eccentric pipe 12 from the center line C1 of the first eccentric pipe 11. At the same time, an initial eccentricity occurs between the first eccentric pipe 11 and the second eccentric pipe 12.

Next, the first eccentric pipe 11 and the first sleeve 21 are fixed by the tie bolts 37 in both the axial direction and the circumferential direction. Further, the second eccentric pipe 12 and the second sleeve 22 are fixed by the tie bolts 47 in both the axial direction and the circumferential direction.

By thus displacing the center line C2 of the second eccentric pipe 12 from the center line C1 of the first eccentric pipe 11, even when the first pipe 1 and the second pipe 2 are laterally displaced with respect to a design position, the eccentric universal joint mechanism 10 can absorb the displacement and, in addition, can absorb the initial eccentricity between the first eccentric pipe 11 and the second eccentric pipe 12, and can securely connect the first pipe 1 and the second pipe 2.

Third Embodiment

A third embodiment of the present invention will now be described with reference to FIGS. 8A and 8B.

Figure 8A:
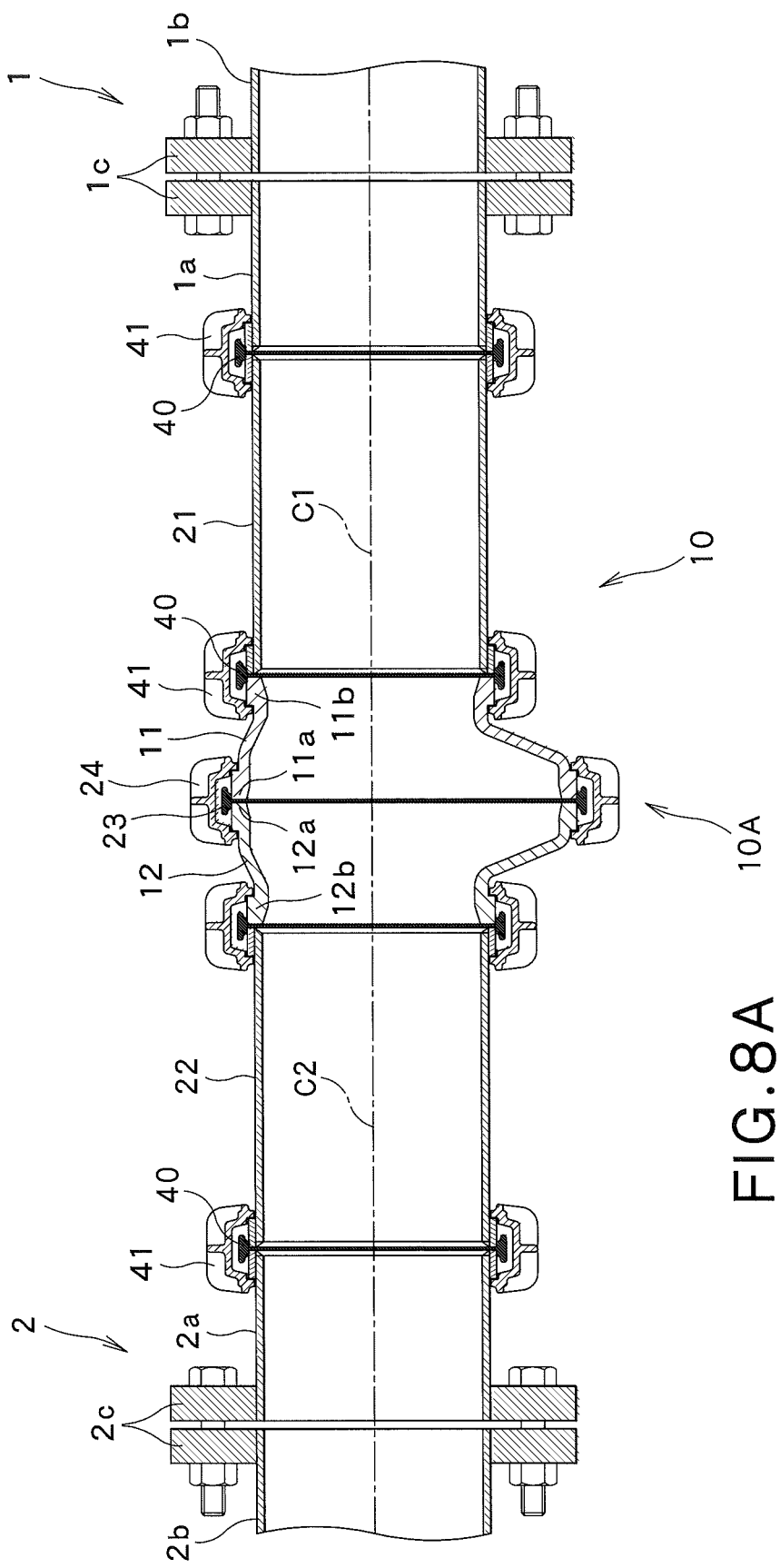
FIG. 8A is a cross-sectional side view illustrating the action of an eccentric universal joint mechanism and an eccentric universal joint according to a third embodiment.
Figure 8B:
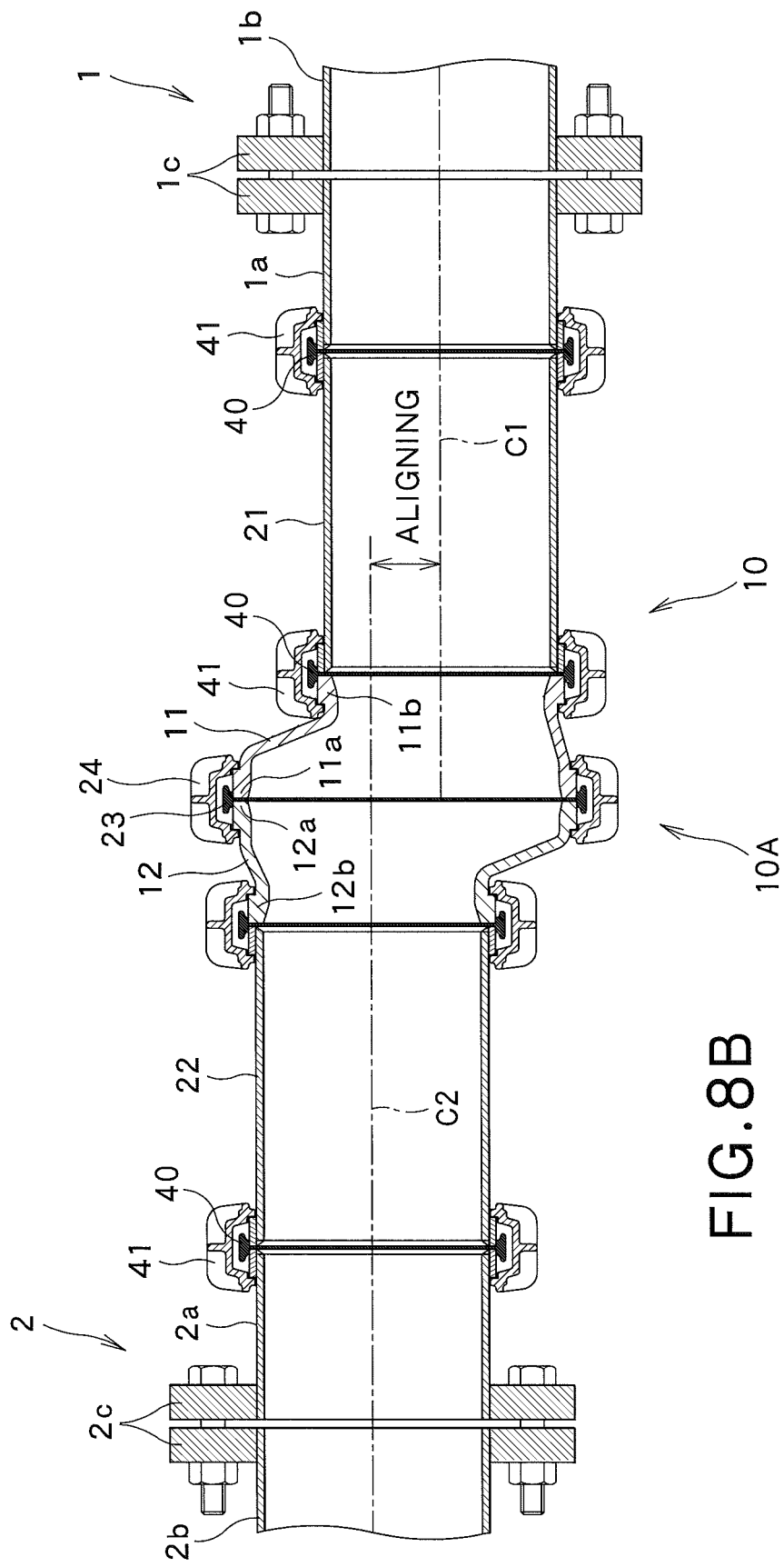
FIG. 8B is a cross-sectional side view illustrating the action of the eccentric universal joint mechanism and the eccentric universal joint according to the third embodiment.

In the third embodiment shown in FIGS. 8A and 8B, the first eccentric pipe 11 of the eccentric universal joint 10A is not slidable with respect to the first sleeve 21, and the second eccentric pipe 12 is not slidable with respect to the second sleeve 22.

In the third embodiment shown in FIGS. 8A and 8B, the same symbols are used for the same components or elements as those of the first embodiment shown in FIGS. 1 through 3B, and a detailed description thereof is omitted.

Referring to FIGS. 8A and 8B, the first eccentric pipe 11 and the second eccentric pipe 12 of the eccentric universal joint 10A do not slide with respect to the first sleeve 21 and the second sleeve 22, respectively, in the axial direction. A joining area between the first eccentric pipe 11 and the first sleeve 21 and a joining area between the second eccentric pipe 12 and the second sleeve 22 are each covered with a second packing 40. The second packings 40 are each held by a second housing 41 which is circumferentially divided.

Referring to FIGS. 8A and 8B, when the first pipe 1 and the second pipe 2 are displaced from a design position in the lateral direction (in the vertical direction in FIGS. 8A and 8B), the second eccentric pipe 12 of the eccentric universal joint 10A is rotated with respect to the first eccentric pipe 11 to displace the center line C2 of the second eccentric pipe 12 from the center line C1 of the first eccentric pipe 11 (see FIG. 8B).

By thus displacing the center line C2 of the second eccentric pipe 12 from the center line C1 of the first eccentric pipe 11, even when the first pipe 1 and the second pipe 2 are laterally displaced with respect to a design position, the eccentric universal joint mechanism 10 can absorb the displacement and securely connect the first pipe 1 and the second pipe 2.

Fourth Embodiment

An eccentric universal joint mechanism and an eccentric universal joint according to a fourth embodiment will now be described with reference to FIG. 9.

Figure 9:
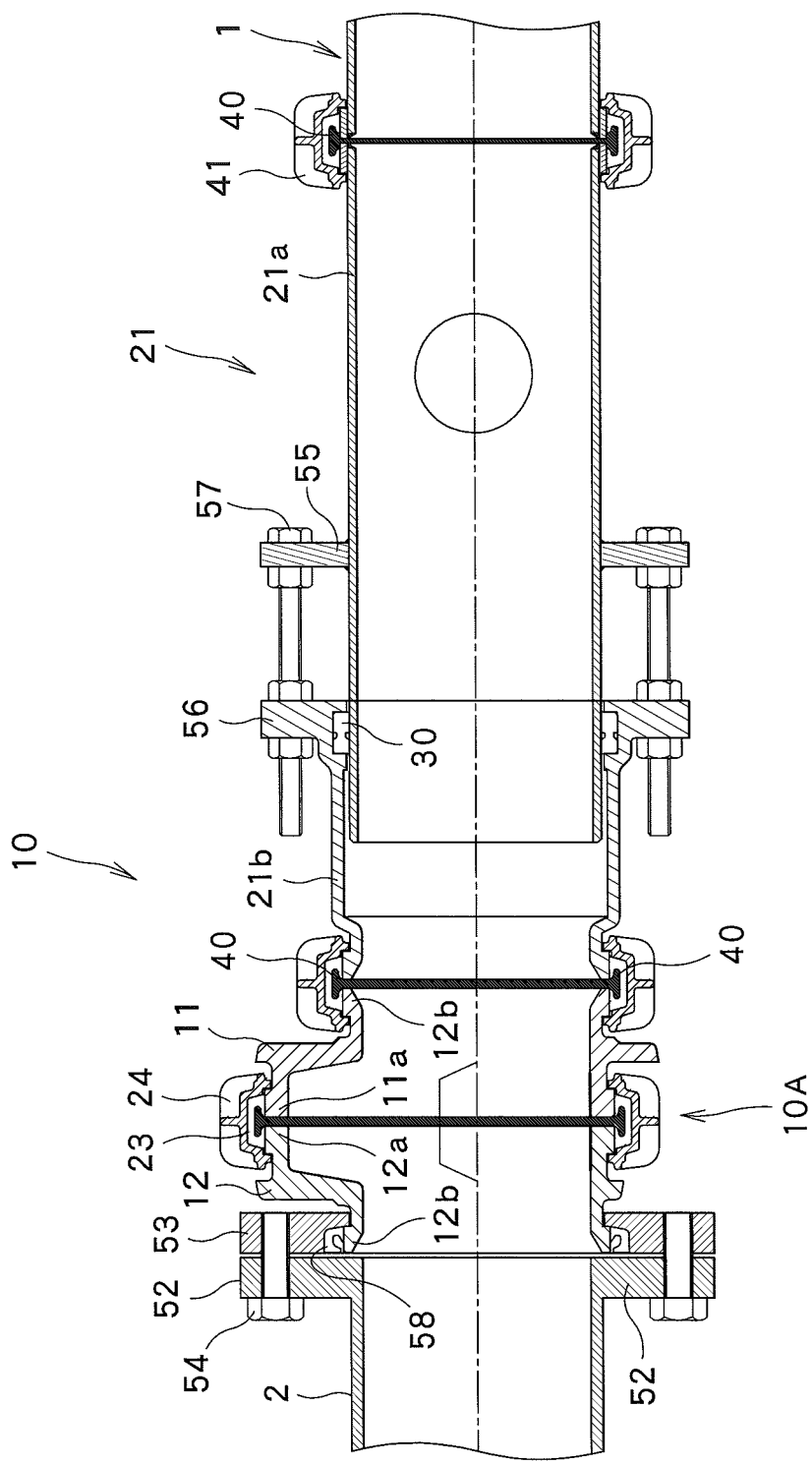
FIG. 9 is a cross-sectional side view illustrating the action of an eccentric universal joint mechanism and an eccentric universal joint according to a fourth embodiment.

FIG. 9 is a cross-sectional side view of the eccentric universal joint mechanism and the eccentric universal joint.

As shown in FIG. 9, the eccentric universal joint mechanism 10 is to connect a first pipe 1 and a second pipe 2.

The first pipe 1 and the second pipe 2, which are existing ones, can sometimes be installed at a position somewhat displaced from a design position in the axial direction and in the lateral direction.

Even when the first pipe 1 and the second pipe 2 are somewhat displaced axially and laterally from a design position, the eccentric universal joint mechanism 10 according to the present invention can connect the first pipe 1 and the second pipe 2 in an appropriate fashion.

The eccentric universal joint mechanism 10 includes a first sleeve 21, composed of two divided sleeves 21a, 21b, and an eccentric universal joint 10A joined to the first sleeve 21.

The eccentric universal joint 10A includes a first eccentric pipe 11 joined to the divided sleeve 21b of the first sleeve 21, and a second eccentric pipe 12 rotatably joined to the first eccentric pipe 11.

The first eccentric pipe 11 and the second eccentric pipe 12 have substantially the same structure as that of the first embodiment shown in FIGS. 1 through 3B. Thus, as shown in FIG. 3A, the first eccentric pipe 11 has a large-diameter portion (first opening) 11a of the side of the second eccentric pipe 12, and a small-diameter portion (second opening) 11b of the side of the first sleeve 21. The axis of the small-diameter portion 11b is eccentric to the axis of the large-diameter portion 11a. The axis of the small-diameter portion 11b constitutes the center line C1 of the first eccentric pipe 11.

As shown in FIG. 3B, the second eccentric pipe 12 has a large-diameter portion (third opening) 12a of the side of the first eccentric pipe 11, and a small-diameter portion (fourth opening) 12b of the side of a mounting housing 53. The axis of the small-diameter portion 12b is eccentric to the axis of the large-diameter portion 12a. The axis of the small-diameter portion 12b constitutes the center line C2 of the second eccentric pipe 12. The large-diameter portion (first opening) 11a of the first eccentric pipe 11 is joined to the large-diameter portion (third opening) 12a of the second eccentric pipe 12.

By rotating the second eccentric pipe 12 with respect to the first eccentric pipe 11 in FIGS. 3A and 3B, the axis of the small-diameter portion 12b of the second eccentric pipe 12 (i.e. the center line C2 of the second eccentric pipe 12) can be made to coincide with the axis of the small-diameter portion 11b of the first eccentric pipe 11 (i.e. the center line C1 of the first eccentric pipe 11).

By further rotating the second eccentric pipe 12 with respect to the first eccentric pipe 11, the axis of the small-diameter portion 12b of the second eccentric pipe 12 (i.e. the center line C2 of the second eccentric pipe 12) can be significantly displaced from the axis of the small-diameter portion 11b of the first eccentric pipe 11 (i.e. the center line C1 of the first eccentric pipe 11). Therefore, even when there is a considerable displacement between the first sleeve 21 and the second pipe 2 in the lateral direction, the eccentric universal joint 10A can make an adjustment (aligning) to the lateral displacement.

A joining area between the first eccentric pipe 11 and the second eccentric pipe 12 in the eccentric universal joint 10A is covered with a first packing 23. The first packing 23 is held by a first housing 24 which surrounds the first packing 23 and which is circumferentially divided. Each division of the first housing 24 is fixed by fixing bolts (not shown).

The divided sleeve 21a of the first sleeve 21 is joined to the first pipe 1. The second eccentric pipe 12 of the eccentric universal joint 10A is joined to the second pipe 2. The second eccentric pipe 12 has a mounting flange 52. The outer periphery of the small-diameter portion 12b of the second eccentric pipe 12 is held by a mounting housing 53. The mounting housing 53 and the mounting flange 52 of the second pipe 2 are fastened by fixing bolts 54. A rubber ring 58 is interposed between the small-diameter portion 12b of the second eccentric pipe 12 and the mounting housing 53.

A joining area between the first eccentric pipe 11 of the eccentric universal joint 10A and the divided sleeve 21b of the first sleeve 21, and a joining area between the divided sleeve 21a of the first sleeve 21 and the first pipe 1 are each covered with a second packing 40. The second packings 40 are each held by a second housing 41 which surrounds the second packing 40 and which is circumferentially divided.

The divided sleeve 21a of the first sleeve 21 has, on its exterior surface, a mounting flange 55, while the divided sleeve 21b has, on its exterior surface, a mounting flange 56. The mounting flanges 55, 56 are fixed in the circumferential direction and in the axial direction by tie bolts 57 mounted to the mounting flanges 55, 56 along the circumferential direction. The divided sleeve 21b of the first sleeve 21 is axially slidable on the outer peripheral surface of the divided sleeve 21a. A sliding packing 30 is interposed between the outer peripheral surface of the divided sleeve 21a and the mounting flange 56 of the divided sleeve 21b.

The operation of the thus-constructed eccentric universal joint mechanism 10 of this embodiment will now be described with reference to FIG. 9.

As in the first embodiment, when the existing first and second pipes 1, 2 are displaced from a design position in the lateral direction, the second eccentric pipe 12 of the eccentric universal joint 10A is rotated with respect to the first eccentric pipe 11 to displace the center line C2 of the second eccentric pipe 12 from the center line C1 of the first eccentric pipe 11 by a distance which is equal to the lateral displacement between the first pipe 1 and the second pipe 2, as shown in FIG. 2. The operation of displacing the center line C2 of the second eccentric pipe 12 from the center line C1 of the first eccentric pipe 11 by a distance equal to the lateral displacement between the first pipe 1 and the second pipe 2 is termed aligning.

Thereafter, the displacement between the center line C1 of the first eccentric pipe 11 and the center line C2 of the second eccentric pipe 12 is maintained without rotation of the second eccentric pipe 12 with respect to the first eccentric pipe 11.

When the first pipe 1 and the second pipe 2 are slightly displaced from the design position in the axial direction, the divided sleeve 21b of the first sleeve 21 is slid with respect to the divided sleeve 21a in the axial direction. Next, the divided sleeves 21a, 21b of the first sleeve 21 are fixed by the tie bolts 57 in both the axial direction and the circumferential direction.

As described above, the second eccentric pipe 12 is rotated with respect to the first eccentric pipe 11 to displace the center line C2 of the second eccentric pipe 12 from the center line C1 of the first eccentric pipe 11, and the divided sleeves 21a, 21b of the first sleeve 21 are slid with respect to each other in the axial direction. By performing such an operation, even when the first pipe 1 and the second pipe 2 are laterally and axially displaced with respect to a design position, the eccentric universal joint mechanism 10 can absorb the displacement and securely connect the first pipe 1 and the second pipe 2.

Fifth Embodiment

An eccentric universal joint mechanism and an eccentric universal joint according to a fifth embodiment will now be described with reference to FIG. 10 and FIGS. 11A and 11B.

Figure 10:
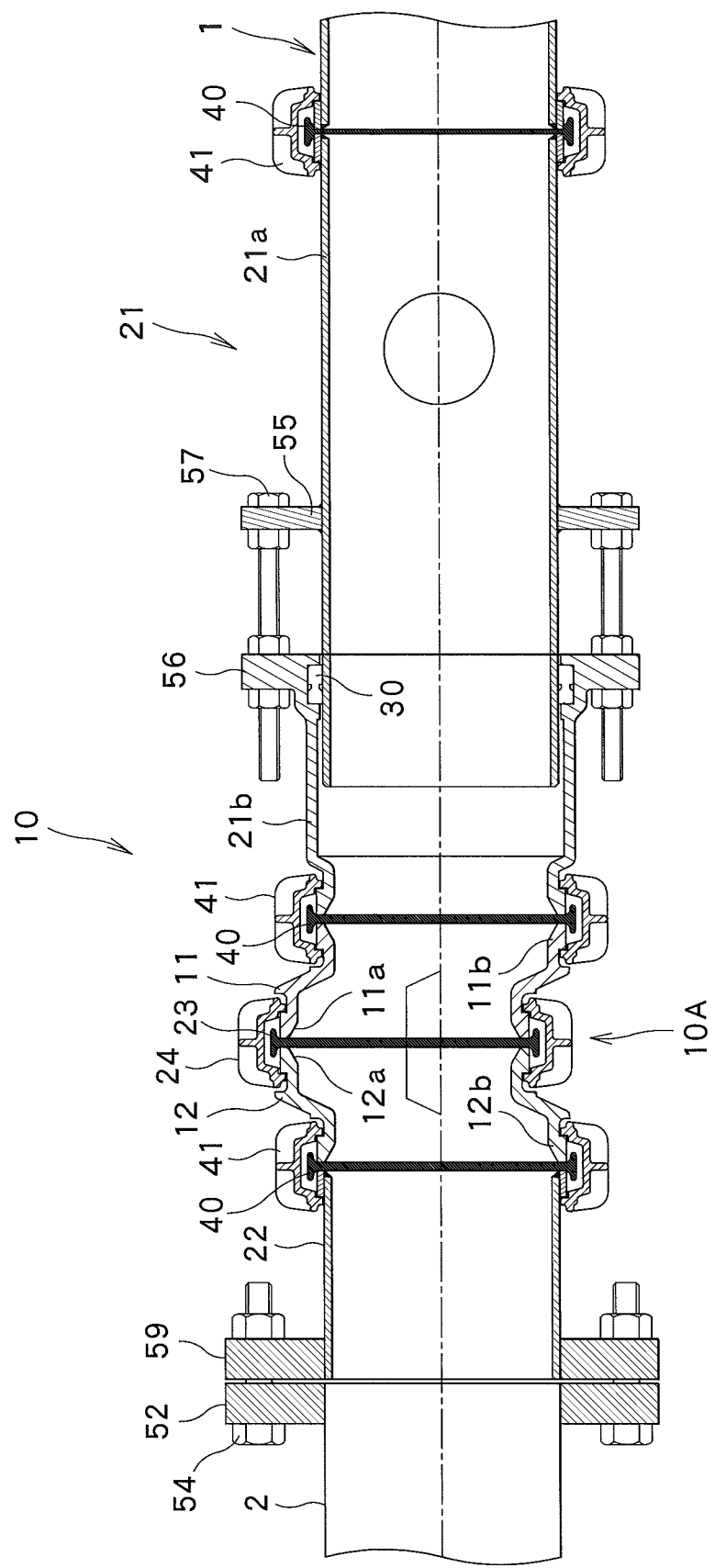
FIG. 10 is a cross-sectional side view illustrating the action of an eccentric universal joint mechanism and an eccentric universal joint according to a fifth embodiment.
Figure 11A:
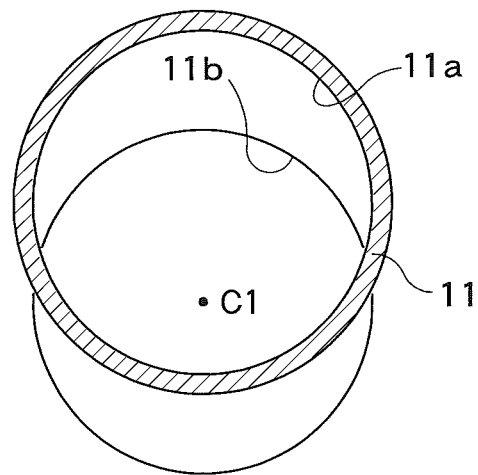
FIG. 11A is a front view of a first eccentric pipe.
Figure 11B:
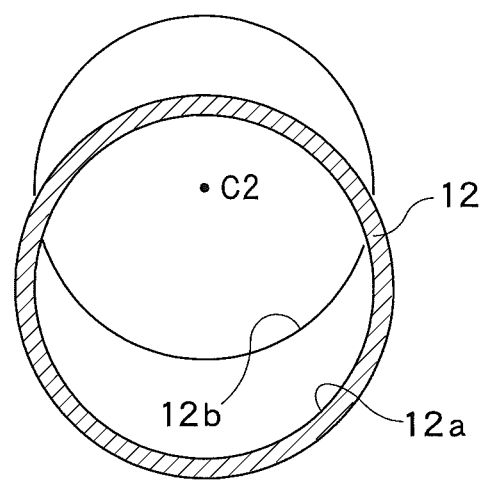
FIG. 11B is a front view of a second eccentric pipe.

FIG. 10 is a cross-sectional side view of the eccentric universal joint mechanism and the eccentric universal joint, FIG. 11A is a front view showing the interior of a first eccentric pipe, and FIG. 11B is a front view showing the interior of a second eccentric pipe.

As shown in FIG. 10 and FIGS. 11A and 11B, the eccentric universal joint mechanism 10 is to connect a first pipe 1 and a second pipe 2.

The first pipe 1 and the second pipe 2, which are existing ones, can sometimes be installed at a position somewhat displaced from a design position in the axial direction and in the lateral direction.

Even when the first pipe 1 and the second pipe 2 are somewhat displaced axially and laterally from a design position, the eccentric universal joint mechanism 10 according to the present invention can connect the first pipe 1 and the second pipe 2 in an appropriate fashion.

The eccentric universal joint mechanism 10 includes a first sleeve 21, composed of two divided sleeves 21a, 21b, a second sleeve 22, and an eccentric universal joint 10A connecting the divided sleeve 21b of the first sleeve 21 and the second sleeve 22.

The eccentric universal joint 10A includes a first eccentric pipe 11 joined to the divided sleeve 21b of the first sleeve 21, and a second eccentric pipe 12 joined to the second sleeve 22 and rotatably joined to the first eccentric pipe 11.

The first eccentric pipe 11 and the second eccentric pipe 12 have approximately the same structure. In particular, as shown in FIG. 11A, the first eccentric pipe 11 has a first opening 11a of the side of second eccentric pipe 12, and a second opening 11b of the side of the divided sleeve 21b. The axis of the second opening 11b is eccentric to the axis of the first opening 11a. The axis of the second opening 11b constitutes the center line C1 of the first eccentric pipe 11.

As shown in FIG. 11B, the second eccentric pipe 12 has a third opening 12a of the side of the first eccentric pipe 11, and a fourth opening 12b of the side of the second sleeve 22. The axis of the fourth opening 12b is eccentric to the axis of the third opening 12a. The axis of the fourth opening 12b constitutes the center line C2 of the second eccentric pipe 12. The first opening 11a of the first eccentric pipe 11 is joined to the third opening 12a of the second eccentric pipe 12. The first opening 11a and the second opening 11b of the first eccentric pipe 11 have the same diameter, while the third opening 12a and the fourth opening 12b of the second eccentric pipe 12 have the same diameter.

Referring to FIGS. 11A and 11B, by rotating the second eccentric pipe 12 with respect to the first eccentric pipe 11, the axis of the fourth opening 12b of the second eccentric pipe 12 (i.e. the center line C2 of the second eccentric pipe 12) can be made to coincide with the axis of the second opening 11b of the first eccentric pipe 11 (i.e. the center line C1 of the first eccentric pipe 11).

By further rotating the second eccentric pipe 12 with respect to the first eccentric pipe 11, the axis of the fourth opening 12b of the second eccentric pipe 12 (i.e. the center line C2 of the second eccentric pipe 12) can be significantly displaced from the axis of the second opening 11b of the first eccentric pipe 11 (i.e. the center line C1 of the first eccentric pipe 11). Therefore, even when there is a considerable displacement between the first sleeve 21 and the second sleeve 22 in the lateral direction, the eccentric universal joint 10A can make an adjustment (aligning) to the lateral displacement.

A joining area between the first eccentric pipe 11 and the second eccentric pipe 12 in the eccentric universal joint 10A is covered with a first packing 23. The first packing 23 is held by a first housing 24 which surrounds the first packing 23 and which is circumferentially divided. Each division of the first housing 24 is fixed by fixing bolts (not shown).

The divided sleeve 21a of the first sleeve 21 is joined to the first pipe 1. The second eccentric pipe 12 of the eccentric universal joint 10A is joined to the second sleeve 22 which, in turn, is joined to the second pipe 2. The second pipe 2 has a mounting flange 52, while the second sleeve 22 has a mounting flange 59. The mounting flange 52 and the mounting flange 59 are fastened by fixing bolts 54.

A joining area between the second eccentric pipe 12 of the eccentric universal joint 10A and the second sleeve 22, and a joining area between the divided sleeve 21a of the first sleeve 21 and the first pipe 1 are each covered with a second packing 40. The second packings 40 are each held by a second housing 41 which surrounds the second packing 40 and which is circumferentially divided.

The divided sleeve 21a of the first sleeve 21 has, on its exterior surface, a mounting flange 55, while the divided sleeve 21b has, on its exterior surface, a mounting flange 56. The mounting flanges 55, 56 are fixed in the circumferential direction and in the axial direction by tie bolts 57 mounted to the mounting flanges 55, 56 along the circumferential direction. The divided sleeve 21b of the first sleeve 21 is axially slidable on the outer peripheral surface of the divided sleeve 21a. A sliding packing 30 is interposed between the outer peripheral surface of the divided sleeve 21a and the mounting flange 56 of the divided sleeve 21b.

The operation of the thus-constructed eccentric universal joint mechanism 10 of this embodiment will now be described with reference to FIG. 10 and FIGS. 11A and 11B.

When the existing first and second pipes 1, 2 are displaced from a design position in the lateral direction, the second eccentric pipe 12 of the eccentric universal joint 10A is rotated with respect to the first eccentric pipe 11 to displace the center line C2 of the second eccentric pipe 12 from the center line C1 of the first eccentric pipe 11 by a distance which is equal to the lateral displacement between the first pipe 1 and the second pipe 2. The operation of displacing the center line C2 of the second eccentric pipe 12 from the center line C1 of the first eccentric pipe 11 by a distance equal to the lateral displacement between the first pipe 1 and the second pipe 2 is termed aligning.

Thereafter, the displacement between the center line C1 of the first eccentric pipe 11 and the center line C2 of the second eccentric pipe 12 is maintained without rotation of the second eccentric pipe 12 with respect to the first eccentric pipe 11.

When the first pipe 1 and the second pipe 2 are slightly displaced from the design position in the axial direction, the divided sleeve 21b of the first sleeve 21 is slid with respect to the divided sleeve 21a in the axial direction. Next, the divided sleeves 21a, 21b of the first sleeve 21 are fixed by the tie bolts 57 in both the axial direction and the circumferential direction.

As described above, the second eccentric pipe 12 is rotated with respect to the first eccentric pipe 11 to displace the center line C2 of the second eccentric pipe 12 from the center line C1 of the first eccentric pipe 11, and the divided sleeves 21a, 21b of the first sleeve 21 are slid with respect to each other in the axial direction. By performing such an operation, even when the first pipe 1 and the second pipe 2 are laterally and axially displaced with respect to a design position, the eccentric universal joint mechanism 10 can absorb the displacement and securely connect the first pipe 1 and the second pipe 2.

Sixth Embodiment

An eccentric universal joint mechanism and an eccentric universal joint according to a sixth embodiment will now be described with reference to FIG. 12.

Figure 12:
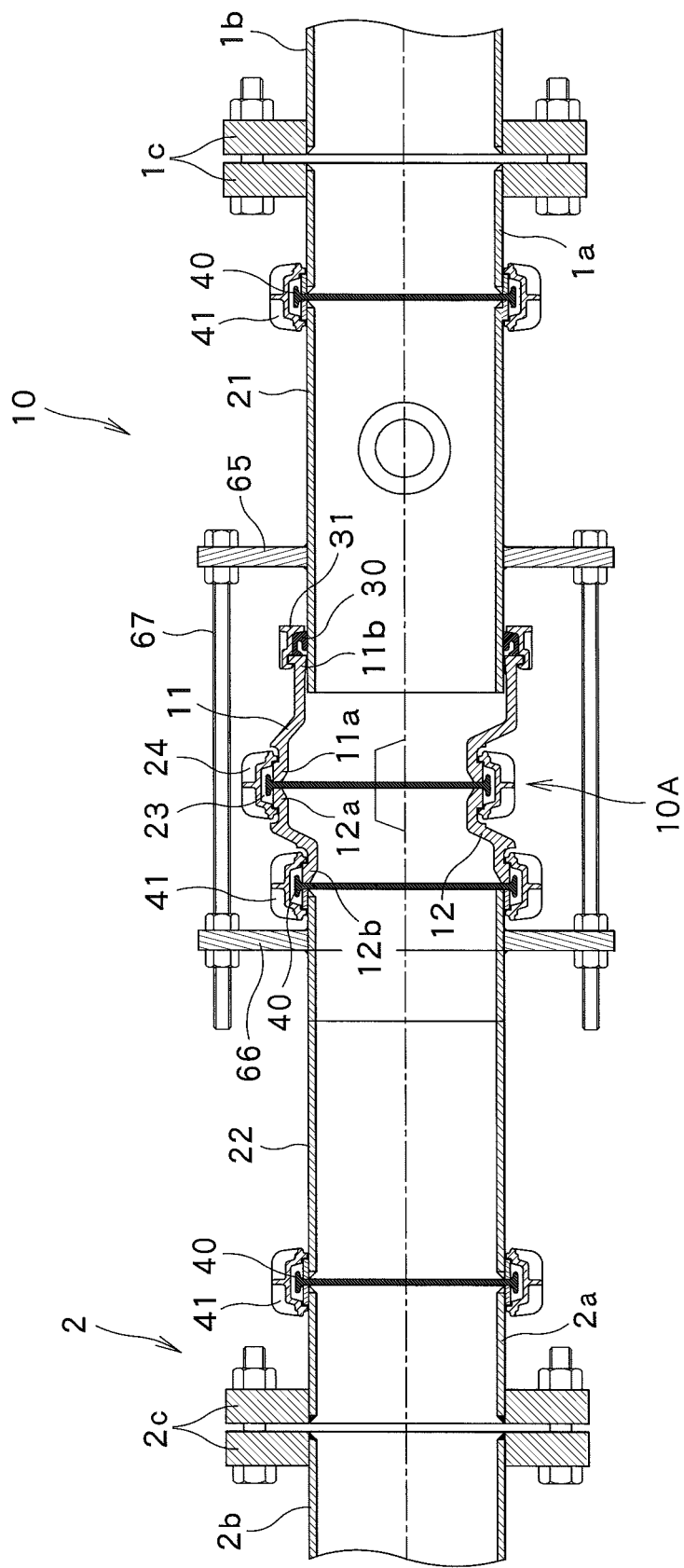
FIG. 12 is a cross-sectional side view illustrating the action of an eccentric universal joint mechanism and an eccentric universal joint according to a sixth embodiment.

FIG. 12 is a cross-sectional side view of the eccentric universal joint mechanism and the eccentric universal joint.

As shown in FIG. 12, the eccentric universal joint mechanism 10 is to connect a first pipe 1 and a second pipe 2.

The first pipe 1 and the second pipe 2, which are existing ones, can sometimes be installed at a position somewhat displaced from a design position in the axial direction and in the lateral direction.

Even when the first pipe 1 and the second pipe 2 are somewhat displaced axially and laterally from a design position, the eccentric universal joint mechanism 10 according to the present invention can connect the first pipe 1 and the second pipe 2 in an appropriate fashion.

The eccentric universal joint mechanism 10 includes a first sleeve 21, a second sleeve 22, and an eccentric universal joint 10A connecting the first sleeve 21 and the second sleeve 22.

The eccentric universal joint 10A includes a first eccentric pipe 11 joined to the first sleeve 21, and a second eccentric pipe 12 joined to the second sleeve 22 and rotatably joined to the first eccentric pipe 11.

The first eccentric pipe 11 and the second eccentric pipe 12 have approximately the same structure. Further, the first eccentric pipe 11 and the second eccentric pipe 12 have exactly the same structure as the first eccentric pipe 11 and the second eccentric pipe 12 of the fifth embodiment shown in FIG. 10 and FIGS. 11A and 11B.

Referring to FIG. 12, by rotating the second eccentric pipe 12 with respect to the first eccentric pipe 11, the axis of the fourth opening 12b of the second eccentric pipe 12 (i.e. the center line C2 of the second eccentric pipe 12) can be made to coincide with the axis of the second opening 11b of the first eccentric pipe 11 (i.e. the center line C1 of the first eccentric pipe 11).

By further rotating the second eccentric pipe 12 with respect to the first eccentric pipe 11, the axis of the fourth opening 12b of the second eccentric pipe 12 (i.e. the center line C2 of the second eccentric pipe 12) can be significantly displaced from the axis of the second opening 11b of the first eccentric pipe 11 (i.e. the center line C1 of the first eccentric pipe 11). Therefore, even when there is a considerable displacement between the first sleeve 21 and the second sleeve 22 in the lateral direction, the eccentric universal joint 10A can make an adjustment (aligning) to the lateral displacement.

A joining area between the first eccentric pipe 11 and the second eccentric pipe 12 in the eccentric universal joint 10A is covered with a first packing 23. The first packing 23 is held by a first housing 24 which surrounds the first packing 23 and which is circumferentially divided. Each division of the first housing 24 is fixed by fixing bolts (not shown).

As shown in FIG. 12, the first eccentric pipe 11 of the eccentric universal joint 10A and the first sleeve 21 are joined slidably with respect to each other in the axial direction. A joining area between the first eccentric pipe 11 and the first sleeve 21 is covered with a sliding packing 30. The sliding packing 30 is held by a sliding packing housing 31 which is circumferentially divided. The first sleeve 21 is joined to the first pipe 1. The second eccentric pipe 12 of the eccentric universal joint 10A is joined to the second sleeve 22 which, in turn, is joined to the second pipe 2.

A joining area between the second eccentric pipe 12 of the eccentric universal joint 10A and the second sleeve 22, a joining area between the first sleeve 21 and the first pipe 1, and a joining area between the second sleeve 22 and the second pipe 2 are each covered with a second packing 40. The second packings 40 are each held by a second housing 41 which surrounds the second packing 40 and which is circumferentially divided.

As shown in FIG. 12, the first pipe 1 and the second pipe 2, on the first sleeve 21 side and on the second sleeve 22 side, have a short flange pipe 1a and a short flange pipe 2a, respectively. The short flange pipes 1a, 2a are connected to main pipes 1b, 2b via flanges 1c, 2c. The short flange pipe 1a and the main pipe 1b constitute the first pipe 1, while the short flange pipe 2a and the main pipe 2b constitute the second pipe 2. The first sleeve 21 has, on its exterior surface, a mounting flange 65, while the second sleeve 22 has, on its exterior surface, a mounting flange 66. The first sleeve 21 and the second sleeve 22 are fixed in the circumferential direction and in the axial direction by tie bolts 67 mounted to the mounting flanges 65, 66 along the circumferential direction.

The operation of the thus-constructed eccentric universal joint mechanism 10 of this embodiment will now be described with reference to FIG. 12.

When the existing first and second pipes 1, 2 are displaced from a design position in the lateral direction, the second eccentric pipe 12 of the eccentric universal joint 10A is rotated with respect to the first eccentric pipe 11 to displace the center line C2 of the second eccentric pipe 12 from the center line C1 of the first eccentric pipe 11 by a distance which is equal to the lateral displacement between the first pipe 1 and the second pipe 2. The operation of displacing the center line C2 of the second eccentric pipe 12 from the center line C1 of the first eccentric pipe 11 by a distance equal to the lateral displacement between the first pipe 1 and the second pipe 2 is termed aligning.

Thereafter, the displacement between the center line C1 of the first eccentric pipe 11 and the center line C2 of the second eccentric pipe 12 is maintained without rotation of the second eccentric pipe 12 with respect to the first eccentric pipe 11.

When the first pipe 1 and the second pipe 2 are slightly displaced from the design position in the axial direction, the first eccentric pipe 11 of the eccentric universal joint 10A is slid with respect to the first sleeve 21 in the axial direction. Next, the first sleeve 21 and the second sleeve 22 are fixed by the tie bolts 67 in both the axial direction and the circumferential direction.

As described above, the second eccentric pipe 12 is rotated with respect to the first eccentric pipe 11 to displace the center line C2 of the second eccentric pipe 12 from the center line C1 of the first eccentric pipe 11, and the first eccentric pipe 11 is slid with respect to the first sleeve 21 in the axial direction. By performing such an operation, even when the first pipe 1 and the second pipe 2 are laterally and axially displaced with respect to a design position, the eccentric universal joint mechanism 10 can absorb the displacement and securely connect the first pipe 1 and the second pipe 2.

DESCRIPTION OF THE SYMBOLS 1 first pipe
2 second pipe
10 eccentric universal joint mechanism
10A eccentric universal joint
11 first eccentric pipe
12 second eccentric pipe
21 first sleeve
21a, 21b divided sleeve
22 second sleeve
23 first packing
24 first housing
30 sliding packing
31 sliding packing housing
35 mounting flange
36 mounting flange
37 tie bolt
40 second packing
41 second housing
45 mounting flange
46 mounting flange
47 tie bolt
52 mounting flange
53 mounting housing
54 fixing bolt
55 mounting flange
56 mounting flange
57 tie bolt
59 mounting flange
65 mounting flange
66 mounting flange
67 tie bolt

The invention claimed is:

1. An eccentric universal joint mechanism comprising:
a first sleeve;
a second sleeve; and
an eccentric universal joint connecting the first sleeve and the second sleeve,
wherein the eccentric universal joint includes a first eccentric pipe joined to the first sleeve and having a first opening and a second opening whose axes are eccentric to each other, and a second eccentric pipe joined to the second sleeve and rotatably joined to the first eccentric pipe, and having a third opening and a fourth opening whose axes are eccentric to each other,
wherein the first opening of the first eccentric pipe is joined to the third opening of the second eccentric pipe,
wherein a displacement between the axis of the second opening of the first eccentric pipe and the axis of the fourth opening of the second eccentric pipe is determined by the rotational position of the second eccentric pipe with respect to the first eccentric pipe, and wherein a joining area between the first eccentric pipe and the second eccentric pipe in the eccentric universal joint is covered with a first packing which is held by a dividable first housing.

2. The eccentric universal joint mechanism according to claim 1, wherein a joining area between the first sleeve and the first eccentric pipe or a joining area between the second sleeve and the second eccentric pipe are each covered with a second packing which is held by a dividable second housing.

3. The eccentric universal joint mechanism according to claim 1, wherein at least the first sleeve and the first eccentric pipe are slidable with respect to each other in the axial direction, and a joining area between the first sleeve and the first eccentric pipe is covered with a sliding packing which is held by a dividable sliding packing housing.

4. The eccentric universal joint mechanism according to claim 3, wherein at least the first sleeve and the first eccentric pipe are fixed by tie bolts in the axial direction.

5. The eccentric universal joint mechanism according to claim 1, wherein the first opening and the second opening of the first eccentric pipe have the same diameter, and the third opening and the fourth opening of the second eccentric pipe have the same diameter.

6. The eccentric universal joint mechanism according to claim 1, wherein the first opening and the second opening of the first eccentric pipe have different diameters, and the third opening and the fourth opening of the second eccentric pipe have different diameters.

7. An eccentric universal joint mechanism comprising:
a first sleeve; and
an eccentric universal joint joined to the first sleeve,
wherein the eccentric universal joint includes a first eccentric pipe joined to the first sleeve and having a first opening and a second opening whose axes are eccentric to each other, and a second eccentric pipe rotatably joined to the first eccentric pipe and having a third opening and a fourth opening whose axes are eccentric to each other, the second eccentric pipe being to be connected to a mounting flange of an existing pipe via a mounting housing, wherein the first opening of the first eccentric pipe is joined to the third opening of the second eccentric pipe, wherein a displacement between the axis of the second opening of the first eccentric pipe and the axis of the fourth opening of the second eccentric pipe is determined by the rotational position of the second eccentric pipe with respect to the first eccentric pipe, and wherein a joining area between the first eccentric pipe and the second eccentric pipe in the eccentric universal joint is covered with a first packing which is held by a dividable first housing.

8. An eccentric universal joint comprising:
a first eccentric pipe having a first opening and a second opening whose axes are eccentric to each other; and
a second eccentric pipe rotatably joined to the first eccentric pipe and having a third opening and a fourth opening whose axes are eccentric to each other, wherein the first opening of the first eccentric pipe is joined to the third opening of the second eccentric pipe, wherein a displacement between the axis of the second opening of the first eccentric pipe and the axis of the fourth opening of the second eccentric pipe is determined by the rotational position of the second eccentric pipe with respect to the first eccentric pipe, and wherein a joining area between the first eccentric pipe and the second eccentric pipe is covered with a first packing which is held by a dividable first housing.

9. The eccentric universal joint according to claim 8, wherein the first opening and the second opening of the first eccentric pipe have the same diameter, and the third opening and the fourth opening of the second eccentric pipe have the same diameter.

10. The eccentric universal joint according to claim 8, wherein the first opening and the second opening of the first eccentric pipe have different diameters, and the third opening and the fourth opening of the second eccentric pipe have different diameters.

* * * * *